United States Patent [19]

Koch et al.

[11] Patent Number: 4,688,953
[45] Date of Patent: Aug. 25, 1987

[54] BEARING RACE MANUFACTURED FROM PREPROFILED WIRE

[75] Inventors: Hans W. Koch, Mathews, N.C.; Co-R. Tanner, Langhorne, Pa.

[73] Assignee: INA Bearing Company, Inc., Bensalem, Pa.

[21] Appl. No.: 899,791

[22] Filed: Aug. 25, 1986

Related U.S. Application Data

[63] Continuation of Ser. No. 563,653, Dec. 20, 1983, abandoned.

[51] Int. Cl.[4] .................. B21D 53/12; B21H 1/12; F16C 19/10; F16C 33/61
[52] U.S. Cl. .................. 384/615; 29/148.4 C; 29/524; 384/502
[58] Field of Search .......... 384/609, 453, 592, 420, 384/593, 613, 615, 622, 499, 502, 505, 569, 570, 577; 29/149.5 C, 148.4 C, 524; 277/216, 220, 221, 222

[56] References Cited

U.S. PATENT DOCUMENTS

| 210,848 | 12/1878 | Gingras | 277/220 |
| 937,811 | 10/1909 | Jenkins | 384/502 |
| 1,584,971 | 5/1926 | Biro | 72/159 |
| 1,794,184 | 2/1931 | Leis | 29/149.5 C |
| 2,033,074 | 3/1936 | Herrmann | 308/202 |
| 2,124,753 | 7/1938 | Schultz | 308/196 |
| 2,361,330 | 10/1944 | Stone | 24/222 |
| 2,476,586 | 7/1949 | Darash | 384/539 |
| 2,762,117 | 9/1956 | Houck | 384/301 X |
| 2,936,201 | 5/1960 | Bader | 384/613 |
| 3,387,900 | 6/1968 | Morrison | 308/196 |
| 3,433,543 | 3/1969 | Eck | 384/621 |
| 3,599,307 | 8/1971 | Campbell | 384/561 X |

FOREIGN PATENT DOCUMENTS 605,360   5/1926   France ..................... 277/220

Primary Examiner—Stuart S. Levy
Assistant Examiner—Lynn M. Sohacki
Attorney, Agent, or Firm—Wigman & Cohen

[57] ABSTRACT

An interlocking thrust washer is disclosed as well as a method for its manufacture. It is made from a flat wire section which is bent into a ring and held together by a complementing tongue and mouth which are formed of opposite ends of the wire. By this method, there is no material wasted.

14 Claims, 6 Drawing Figures

BEARING RACE MANUFACTURED FROM PREPROFILED WIRE

Ths is a continuation of co-pending application Ser. No. 563,653 now abandoned filed on Dec. 20, 1983.

BACKGROUND OF THE INVENTION

The present invention relates to bearing races and more particularly to an interlocking bearing race used in a McPherson Strut bearing, as well as a method of making same.

The bearing race of the present invention is primarily intended for use in oscillatory and slow rotating rolling element type bearings such as McPherson Strut bearings. A typical McPherson Strut bearing consists of two bearing races and a full complement or cage retained ball complement. The components are usually encapsulated for the purpose of holding the assembly together. Other versions of strut bearings have the bearing races enclosed in plastic shells. In addition to performing a retention function, they also provide a sealing capability. As a general application, such strut bearings are mounted in automobile suspension systems.

The bearing races disclosed in the prior art are generally made by machining tubing and bar stock or, alternatively, by blanking out flat strip stock. Those methods are, however, relatively expensive since a great deal of material is wasted. Thus, the larger the diameter of the bearing race, the more expensive manufacturing becomes. That is especially true when the bearing race is blanked out of strip stock since a substantial amount of material within the inside diameter of the race and the outer diameter of the race is lost as waste.

Although the problem of wasted materials has been addressed with respect to bushings, the solution is not entirely satisfactory when applied to bearing races. In U.S. Pat. No. 2,762,117, issued to Houck, for example, the ends of the metal strip are held together by a tongue and mouth configuration which is disposed on a plane parallel to that of the axis of the radial bushing. Because the ends of the strip which form the bushing are interlocked by flattening the tongue within the mouth using radial pressure, the bushing is succeptible to disengagement upon the application of radial forces thereto.

SUMMARY AND OBJECTS OF THE INVENTION

In view of the foregoing limitations and shortcomings of the prior art devices, as well as other disadvantages not specifically mentioned hereinabove, it should be apparent that there still exists a need in the art for a bearing race which is simple and inexpensive to manufacture.

It is therefore a primary objective of this invention to fulfill that need by providing a bearing race which is constructed without wasting any material.

Another object of this invention is to provide a simple and inexpensive method for manufacturing an interlocking bearing race.

Briefly described, the aforementioned objects are accomplished according to the invention by providing a pre-profiled flat wire section having a tongue cut out of one end and a mouth cut out of the opposite end. The wire is then formed into a ring by bending it and pressing the tongue and mouth together in a direction parallel to the axis of the bearing race.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
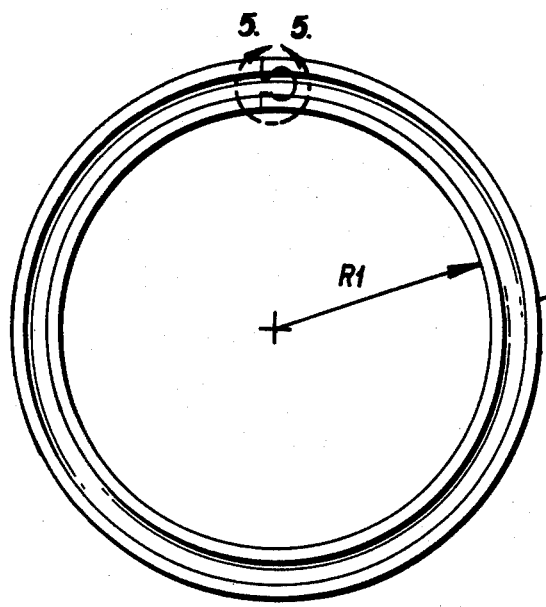
FIG. 1 is a top view of the bearing race.
Figure 5:
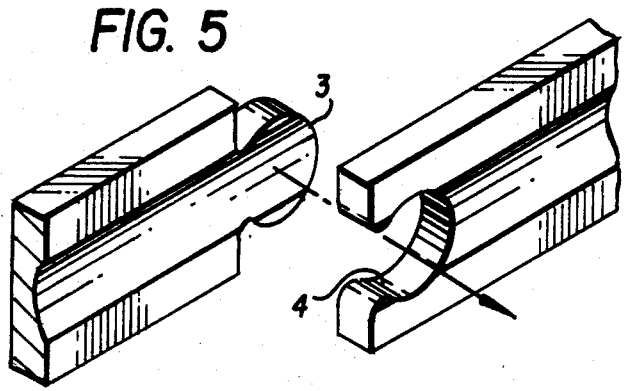
FIG. 5 is an enlarged perspective view of the mouth and tongue portions before they have been joined.
Figure 6:
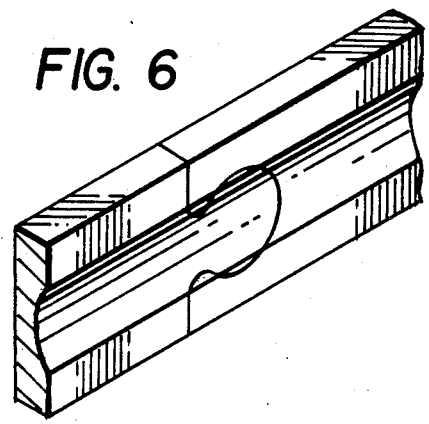
FIG. 6 is an enlarged prespective view of the tongue and mouth after joining.

Referring now in detail to the drawings wherein like parts are designated by like reference numerals throughout, there is illustrated in FIG. 1 the interlocking bearing race designated generally by the reference numeral 1. It comprises a pre-profiled wire section 2 having a tongue 3 at one end and a mouth 4 at the opposite end. As best shown in FIGS. 5 and 6, the tongue 3 and mouth 4 have curvilinear interlocking surfaces generally in the shape of jigsaw puzzle-shaped interlocking elements. As can be seen, the interlocking bearing race 1 is shaped into a ring. The tongue 3 and the mouth 4 are interlocked and lie in a plane orthogonal to that of the axis of the bearing race 1.

Figure 2:
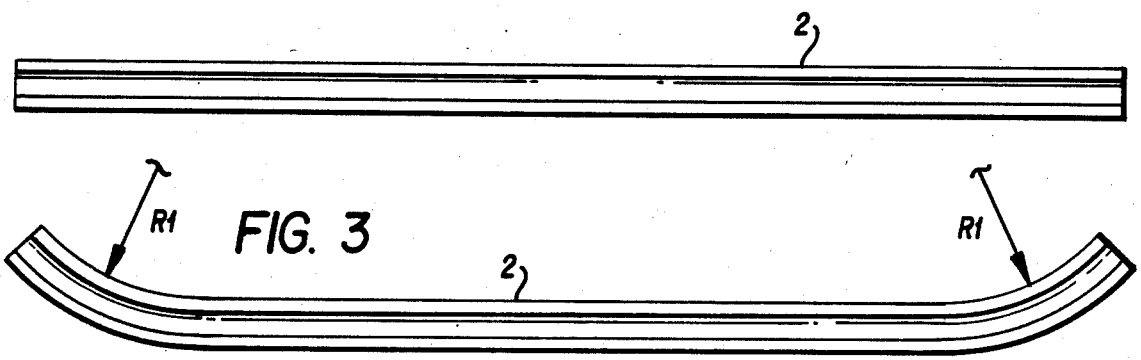
FIG. 2 is a top view of a pre-profiled flat wire section.
Figure 3:
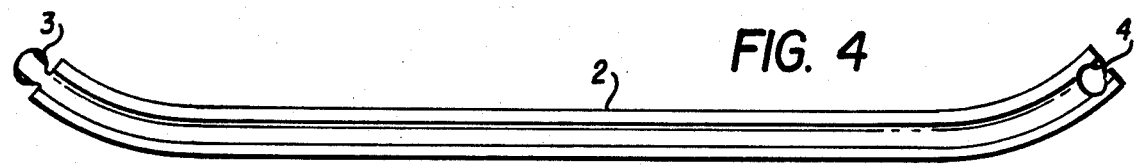
FIG. 3 is a top view of the wire section after its ends have been bent.
Figure 4:
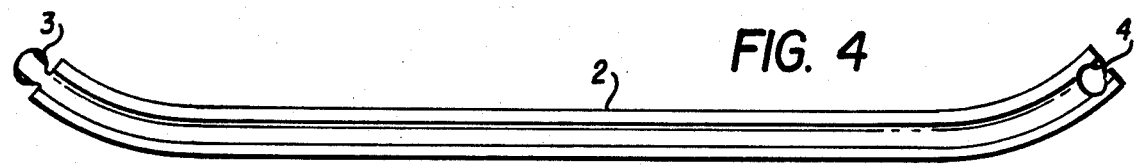
FIG. 4 is a top view of the wire section after the mouth and tongue have been blanked out.

In order to manufacture the above-described bearing race, a pre-profiled flat wire section is cut to a predetermined length as shown in FIG. 2. In the preferred embodiment of this invention, the wire section is bent slightly at each end to a point where the radius of curvature of each of the end sections corresponds to that of the bearing race, as shown in FIG. 3. As FIG. 4 illustrates, the tongue 3 and the mouth 4 are blanked out of the respective wire ends. The wire is then bent into a ring so that the tongue 3 and the mouth 4 are in an engageable position. Using a force parallel to that of the axis of the bearing race 1, the tongue 3 and the mouth 4 are then interlocked as shown in FIG. 6.

As can be easily appreciated from the above-description, there is no waste of material during the manufacturing process. Additionally, because the tongue 3 and the mouth 4 are engaged with each other in a direction parallel to the axis of the bearing race, they will not disengage if the bearing race is subjected to radial forces.

Although only a preferred embodiment is specifically illustrated and described herein, it will be appreciated that many modifications and variations of the present invention are possible in light of the above teachings and within the purview of the appended claims, without departing from the spirit and intended scope of the invention.

What we claim is:

1. A bearing race for use in a bearing comprising a one-piece, pre-profiled, ring-shaped length of wire having only two ends, a tongue at one end of said wire, and a complementary mouth at the opposite end, said bearing race having opposite, substantially parallel first and second faces lying in spaced planes orthogonal to the axis of the bearing race, an annular groove formed in one of said faces, both of said tongue and said mouth extending through said bearing race from said first face to said second face whereby said tongue is interlocked with said mouth by axial engagement of said tongue in said mouth in a direction parallel to the axis of the bearing race.

2. A bearing race according to claim 1 wherein said tongue and mouth have curvilinear, interlocking surfaces.

3. A bearing race according to claim 2, wherein said curvilinear, interlocking surfaces comprise jigsaw puzzle-shaped interlocking elements.

4. A bearing race according to claim 1, wherein said annular groove is shaped as a circular segment in cross-section.

5. A bearing race according to claim 1, wherein the radial dimension thereof is greater than the dimension between said first and second faces.

6. A bearing race for use in a thrust bearing, said bearing race comprising an annular ring having a predetermined center of curvature and being formed by a process comprising the steps of:
   providing a predetermined length of wire having at least one face and two ends;
   forming a bearing groove in said face;
   forming said wire into said annular ring by bending said wire about a bending axis substantially coincident with the center of curvature of said ring such that said one face lies in a plane substantially orthogonal to said bending axis;
   forming interlocking means in said ends comprising a tongue at one of said two ends and a mouth at the other of said two ends; and
   interlocking said two ends by moving said two ends toward one another in a direction sbstantially parallel to said bending axis.

7. A bearing race according to claim 6, wherein said wire has end portions and an intermediate portion between said end portions and wherein said forming step includes the steps of bending each end portion of said wire to a predetermined curvature and then bending the intermediate portion of said wire about said bending axis.

8. A bearing race according to claim 7, wherein the curvature of said end portions and the curvature of said intermediate portion is equal to the curvature of said ring.

9. A bearing race according to claim 6, wherein said annular ring has first and second faces which lie in planes substantially orthogonal to said bending axis.

10. A bearing race according to claim 9, wherein said annular ring has first and second edges, said first edge coinciding with the inner circumference of said ring and said second edge coinciding with the outer circumference of said ring, the radial dimension between said first and second edges being greater than the dimension between said first and second faces.

11. A bearing race according to claim 6, wherein said wire is a flat wire with a pre-profiled bearing groove formed in said one face.

12. A method of making a bearing race for use in a thrust bearing, comprising the steps of:
   providing a predetermined length of wire having at least one face and two ends;
   forming a bearing groove in said face;
   forming said wire into an annular ring having a predetermined center of curvature by bending said wire about a bending axis substantially coincident with said center of curvature such that said one face lies in a plane substantially orthogonal to said bending axis;
   forming interlocking means in said ends comprising a tongue at one of said two ends and a mouth at the other of said two ends; and
   interlocking said two ends by moving said two ends toward one another in a direction substantially parallel to said bending axis.

13. A method according to claim 12, wherein said wire has end portions and an intermediate portion between said end portions and wherein said forming step includes the steps of bending each end portion of said wire to a predetermined curvature and then bending the intermediate portion of said wire about said bending axis.

14. A method according to claim 13, wherein the curvature of said end portions and the curvature of said intermediate portion is equal to the curvature of said ring.

* * * * *

UNITED STATES PATENT AND TRADEMARK OFFICE
CERTIFICATE OF CORRECTION

PATENT NO. : 4,688,953
DATED : August 25, 1987
INVENTOR(S) : Han W. Koch, et al

It is certified that error appears in the above-identified patent and that said Letters Patent is hereby corrected as shown below:

On the title page name of second inventor should read -- Colin R. Tanner --.

In The Claims:

Claim 6, line 32, delete "substantally" and insert --substantially --.

Claim 6, line 38, delete "sbstantially" and insert --substantially--.

Signed and Sealed this

First Day of March, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,688,953

DATED : August 25, 1987

INVENTOR(S) : HANS W. KOCH; COLIN R. TANNER

It is certified that error appears in the above-identified patent and that said Letters Patent is hereby corrected as shown below:

Claim 1 should read as follows:

--1. A bearing race for use in a bearing comprising a one-piece, pre-profiled, ring-shaped length of wire having an arcuate extent of at least 360° and only two ends, said wire having only one tongue disposed at one end thereof and only one mouth complementary to said tongue disposed at the opposite end thereof, said bearing race having opposite, substantially parallel first and second faces lying in spaced planes orthogonal to the axis of the bearing race, an annular groove formed in one of said faces, both of said tongue and said mouth extending through said bearing race from said first face to said second face whereby said tongue is interlocked with said mouth by axial engagement of said tongue in said mouth in a direction parallel to the axis of the bearing race.--

Signed and Sealed this

Sixth Day of September, 1988

*Attest:*

DONALD J. QUIGG

*Attesting Officer*      *Commissioner of Patents and Trademarks*